US011676741B2

(12) United States Patent
Bolde et al.

(10) Patent No.: US 11,676,741 B2
(45) Date of Patent: Jun. 13, 2023

(54) HYBRID CABLE ASSEMBLY

(71) Applicant: International Business Machines Corporation, Armonk, NY (US)

(72) Inventors: Lannie R. Bolde, Ulster Park, NY (US); Michael T. Peets, Staatsburg, NY (US); David C. Olson, Lagrangeville, NY (US); William L. Brodsky, Binghamton, NY (US)

(73) Assignee: International Business Machines Corporation, Armonk, NY (US)

(*) Notice: Subject to any disclaimer, the term of this patent is extended or adjusted under 35 U.S.C. 154(b) by 184 days.

(21) Appl. No.: 17/116,689

(22) Filed: Dec. 9, 2020

(65) Prior Publication Data

US 2021/0090762 A1 Mar. 25, 2021

Related U.S. Application Data

(62) Division of application No. 16/157,279, filed on Oct. 11, 2018, now Pat. No. 10,930,411.

(51) Int. Cl.
*H01B 7/40* (2006.01)
*H01B 7/00* (2006.01)
(Continued)

(52) U.S. Cl.
CPC ............. *H01B 7/40* (2013.01); *G11B 33/126* (2013.01); *H01B 7/0045* (2013.01); *H01B 7/04* (2013.01);
(Continued)

(58) Field of Classification Search
None
See application file for complete search history.

(56) References Cited

U.S. PATENT DOCUMENTS 52,617 A * 2/1866 Splitdorf ............... H01R 31/06
439/502
4,236,779 A * 12/1980 Tang .................. H01R 13/6592
439/936
(Continued)

FOREIGN PATENT DOCUMENTS

DE 102017122048 A1 * 3/2019 ......... B60R 16/0215
DE 112017006740 T5 * 9/2019 ............. G06F 15/16
(Continued)

OTHER PUBLICATIONS

Bagci et al., "Fast and Rigorous Analysis of EMC/EMI Phenomena on Electrically Large and Complex Cable-Loaded Structures", IEEE, 2007. http://ieeexplore.ieee.org/stamp/stamp.jsp?arnumber=4244572.
(Continued)

*Primary Examiner* — Timothy J. Dole
*Assistant Examiner* — Muhammed Azam
(74) *Attorney, Agent, or Firm* — Patterson + Sheridan, LLP

(57) ABSTRACT

A cable assembly is used to connect elements of a computing system. The cable assembly may include a first cable and a connector. The first cable includes an external portion having a first conductor, an electromagnetic (EMC) shielding jacket for the first conductor and a connector disposed at an end of the first conductor. Further, the first cable includes an internal portion comprising a second conductor and a connector disposed on an end of the second conductor. However, the internal portion lacks an EMC shielding jacket for the second conductor. The external portion of the first cable and the internal portion of the first cable form a continuous cable. The connector device comprises a shield area configured to electrically couple with a chassis of a node of a computer system and a retainer configured to physically couple the cable assembly with the chassis. The connector is
(Continued)

configured to electrically couple the external portion of the first cable with the chassis, and wherein the external portion of the first cable meets the internal portion of the first cable at the connector device.

16 Claims, 8 Drawing Sheets

(51) Int. Cl.

| | | |
|---|---|---|
| *H01B 7/04* | (2006.01) | |
| *G11B 33/12* | (2006.01) | |
| *H01R 13/6592* | (2011.01) | |
| *H02G 15/02* | (2006.01) | |
| *H05K 9/00* | (2006.01) | |
| *H01R 13/627* | (2006.01) | |
| *H01R 13/621* | (2006.01) | |
| *G06F 113/16* | (2020.01) | |
| *G06F 1/16* | (2006.01) | |
| *H02G 3/40* | (2006.01) | |
| *H05K 7/14* | (2006.01) | |

(52) U.S. Cl.
CPC ......... *H01R 13/6592* (2013.01); *H02G 15/02* (2013.01); *H05K 9/0098* (2013.01); *G06F 1/1683* (2013.01); *G06F 2113/16* (2020.01); *H01R 13/621* (2013.01); *H01R 13/6271* (2013.01); *H02G 3/40* (2013.01); *H05K 7/1488* (2013.01)

(56) References Cited

U.S. PATENT DOCUMENTS

| | | | |
|---|---|---|---|
| 4,408,816 A | | 10/1983 | Knecht |
| 5,342,203 A | | 8/1994 | Perretta et al. |
| 5,441,424 A * | | 8/1995 | Morlion ............ H01R 13/6592 439/578 |
| 5,495,075 A * | | 2/1996 | Jonckheere ...... H01R 13/65912 174/75 C |
| 5,540,601 A * | | 7/1996 | Botchek ................. H01R 31/06 439/502 |
| 5,632,634 A * | | 5/1997 | Soes .................. H01R 13/6592 439/579 |
| 5,640,606 A * | | 6/1997 | Glenn, Jr. ............ G11B 33/126 710/37 |
| 5,666,267 A * | | 9/1997 | Carter ...................... G06F 1/181 361/627 |
| 5,751,977 A * | | 5/1998 | Alexander .......... G06F 13/4226 710/310 |
| 6,055,582 A * | | 4/2000 | Pascarella ............. G06F 13/409 710/14 |
| 6,124,551 A * | | 9/2000 | Mattos .................... H01B 11/02 174/113 R |
| 6,142,796 A * | | 11/2000 | Behl ..................... G11B 33/122 439/131 |
| 6,250,936 B1 * | | 6/2001 | Armistead ....... H01R 13/65915 439/98 |
| 6,600,703 B1 * | | 7/2003 | Emberty .............. G11B 33/126 |
| 6,839,237 B2 * | | 1/2005 | Berry .................. H05K 7/1489 361/740 |
| 7,007,141 B2 * | | 2/2006 | Li .......................... G06F 3/0614 714/6.22 |
| 7,140,910 B1 * | | 11/2006 | Liao ........................ H01R 13/72 439/502 |
| 7,254,038 B2 * | | 8/2007 | Drako ..................... G06F 1/185 361/752 |
| 7,352,947 B2 | | 4/2008 | Phung et al. |
| 7,730,243 B2 * | | 6/2010 | Kirshtein ................ G06F 3/023 710/5 |
| 7,892,019 B2 | | 2/2011 | Rao et al. |
| 8,025,534 B2 * | | 9/2011 | Bates ................... G06F 13/409 439/638 |
| 8,339,729 B2 * | | 12/2012 | Thompson ......... G11B 15/6835 360/92.1 |
| 8,398,430 B1 * | | 3/2013 | Queru ................... H01R 31/06 439/536 |
| 8,456,845 B2 * | | 6/2013 | Liu .......................... G06F 1/188 361/728 |
| 8,579,641 B1 * | | 11/2013 | Queru ................ H01R 33/7671 439/224 |
| 8,791,364 B2 * | | 7/2014 | Paoletti ................... H01P 1/202 174/79 |
| 9,928,939 B1 | | 3/2018 | Volpone et al. |
| 10,147,522 B2 * | | 12/2018 | Gundel .............. H01B 11/1891 |
| 10,930,411 B2 * | | 2/2021 | Bolde ............... H01R 13/6592 |
| 11,605,480 B2 * | | 3/2023 | Chuganey ............ H01B 11/002 |
| 2002/0010991 A1 | | 1/2002 | Muscarella et al. |
| 2002/0109971 A1 * | | 8/2002 | Gilley .................. H05K 7/1448 361/679.02 |
| 2004/0062496 A1 * | | 4/2004 | Shuman ................. G02B 6/441 385/101 |
| 2004/0203275 A1 * | | 10/2004 | Jeansonne ............. H01R 13/64 439/378 |
| 2004/0268163 A1 * | | 12/2004 | Yeh ........................ G06F 1/266 713/300 |
| 2005/0110047 A1 | | 5/2005 | Katakura et al. |
| 2006/0046569 A1 * | | 3/2006 | Kondou ............... H05K 1/0245 439/497 |
| 2007/0069057 A1 * | | 3/2007 | Gasser ................. G11B 33/126 |
| 2007/0083619 A1 * | | 4/2007 | Chen ...................... H04Q 1/142 709/218 |
| 2008/0123278 A1 * | | 5/2008 | Curnalia ................ G06F 1/187 |
| 2010/0112850 A1 * | | 5/2010 | Rao ...................... H01R 31/005 439/492 |
| 2010/0151723 A1 * | | 6/2010 | Su .......................... H01R 31/06 439/505 |
| 2010/0182754 A1 * | | 7/2010 | Curnalia .............. G11B 33/126 361/733 |
| 2012/0000703 A1 * | | 1/2012 | Kim .................... H01R 13/6471 29/879 |
| 2012/0033377 A1 * | | 2/2012 | Salpeter ............... H05K 7/1497 361/679.02 |
| 2012/0081851 A1 * | | 4/2012 | Trinh .................... G11B 33/126 361/679.02 |
| 2012/0090873 A1 * | | 4/2012 | Gundel .............. H01B 11/1895 174/113 R |
| 2012/0164849 A1 * | | 6/2012 | Lee ........................ H01R 13/62 439/39 |
| 2013/0122751 A1 | | 5/2013 | Ciampolini et al. |
| 2014/0080355 A1 * | | 3/2014 | Wang ................. H01R 13/6592 439/573 |
| 2015/0114711 A1 * | | 4/2015 | Dew ..................... H01B 7/0045 174/72 A |
| 2015/0146353 A1 * | | 5/2015 | MacNeil ................ G06F 1/187 361/679.02 |
| 2015/0170794 A1 | | 6/2015 | Mutnury et al. |
| 2015/0318642 A1 * | | 11/2015 | Lee ....................... H01R 13/506 439/607.05 |
| 2016/0043507 A1 * | | 2/2016 | Rossman ......... H01R 13/65912 174/72 A |
| 2016/0309625 A1 * | | 10/2016 | Brodsky ................. H01R 13/74 |
| 2016/0351298 A1 * | | 12/2016 | Gundel ................. H01B 7/0861 |
| 2018/0314667 A1 | | 11/2018 | Long et al. |
| 2018/0347804 A1 * | | 12/2018 | Soken ...................... G06F 1/18 |
| 2019/0214771 A1 * | | 7/2019 | Diaz .................... H01R 13/6474 |
| 2020/0118711 A1 * | | 4/2020 | Bolde .................. H05K 9/0098 |
| 2021/0239927 A1 * | | 8/2021 | Rivaud ................. G02B 6/4432 |
| 2022/0376441 A1 * | | 11/2022 | He ........................ H01R 12/721 |
| 2023/0070890 A1 * | | 3/2023 | Shrout ................ H01R 13/6581 |

FOREIGN PATENT DOCUMENTS

| | | | | |
|---|---|---|---|---|
| EP | 0080365 A1 * | 6/1983 | | |
| EP | 0536849 A1 * | 10/1992 | | |
| EP | 0570181 A2 * | 5/1993 | | |
| EP | 1478059 A2 * | 11/2004 | ......... | H01R 25/006 |
| EP | 2256870 A1 * | 12/2010 | ......... | H01R 13/512 |
| WO | WO-9712428 A1 * | 4/1997 | ......... | H01R 13/516 |
| WO | WO-9939328 A1 * | 8/1999 | ......... | G06F 1/1601 |

(56) References Cited

FOREIGN PATENT DOCUMENTS

| WO | WO-2004047509 A1 | * | 6/2004 | ........... H01R 12/714 |
| WO | 2010085465 A1 | | 7/2010 | |
| WO | WO-2016151562 A1 | * | 9/2016 | ......... H01R 13/6594 |
| WO | WO-2020048890 A1 | * | 3/2020 | ......... H01R 13/6589 |

OTHER PUBLICATIONS

IBM United States Hardware Announcement 118-060 dated Aug. 7, 2018, 59 pp.
"List of IBM Patents or Patent Applications Treated As Related," for U.S. Appl. No. 17/116,689, filed Dec. 9, 2020.

\* cited by examiner

HYBRID CABLE ASSEMBLY

CROSS-REFERENCE TO RELATED APPLICATIONS

This application is a divisional of co-pending U.S. patent application Ser. No. 16/157,279, filed Oct. 11, 2018. The aforementioned related patent application is herein incorporated by reference in its entirety.

STATEMENT REGARDING PRIOR DISCLOSURE BY THE INVENTORS

The following disclosure(s) are submitted under 35 U.S.C. § 102(b)(1)(A): DISCLOSURE: IBM United States Hardware Announcement 118-060, Aug. 7, 2018.

BACKGROUND

In many computer systems, chassis cables are used to internally connect elements on a front side of the chassis to elements external to the chassis. Further, cables that are outside of the chassis typically include an electromagnetic (EMC) shielding jacket. However, the jacket may make the cables stiff and larger in diameter which take up more space in the chassis and make them difficult to install. In various instances, cables lacking a EMC shielding may be used within chassis; however, coupling the cables having EMC shielding with the cables lacking an EMC shielding introduces a signal integrity issue with increased insertion loss, return loss and other detrimental attributes. Moreover, using individual cables to make the required connections introduces issues that may arise when maintaining the cables as they may be prone to damage.

Thus there is a need for device that may be used to control the cables and minimizes damage to the cables.

SUMMARY

According to one embodiment of the present invention, a cable assembly includes a first cable, a second cable and a connector device. The first cable includes an external portion and an internal portion. The external portion includes a first conductor, an electromagnetic (EMC) shielding jacket for the first conductor, and a connector disposed on an end of the first conductor. The internal portion includes a second conductor and a connector disposed on an end of the second conductor, but lacks an EMC shielding jacket, wherein the external portion of the first cable and the internal portion of the first cable form a continuous cable. The connector device comprises a shield area configured to electrically couple with a chassis, and a retainer configured to physically couple the cable assembly with the chassis. The connector is configured to electrically couple the external portion of the first cable with the chassis, and wherein the external portion of the first cable meets the internal portion of the first cable at the connector device.

In another embodiment, a chassis for a computing system includes a plurality of processor sockets, a plurality of memory modules, a plurality of hard drive bays, a cable pass-through, and a retainer element. Each of the plurality of memory modules configured to house one or more memory cards. Each of the plurality of hard drive bays is configured to house one or more hard drives and is positioned at a first end of the chassis. The cable pass-through is configured to receive a cable assembly, and extends from the first end of the chassis toward a second end of the chassis along a first side of side of the chassis. The retainer element is configured to retain the cable assembly to the chassis.

In another embodiment, a computing system comprises a chassis and a cable assembly. The chassis comprises a plurality of hard drive bays, a cable pass-through, and a retainer element. Each of the plurality of hard drive bays is configured to house one or more hard drives and is positioned at a first end of the chassis. The cable pass-through is configured to travel from the first end of the chassis to a second end of the chassis along a first side of side of the chassis. The cable assembly comprises a first cable and a connector device. The first cable comprises an external portion and an internal portion. The external portion comprises a first conductor, an electromagnetic (EMC) shielding jacket for the first conductor, and a connector disposed on an end of the first conductor. The internal portion comprising a second conductor and a connector disposed on an end of the second conductor, but lacks an EMC shielding jacket, wherein the external portion of the first cable and the internal portion of the first cable form a continuous cable. The external portion of the first cable and the internal portion of the first cable form a continuous cable. The connector device is disposed between the external portion and the internal portion. The connector device includes a shielded area configured to electrically couple with the chassis, and a retainer configured to couple with the retainer element of the chassis.

Figure 1:
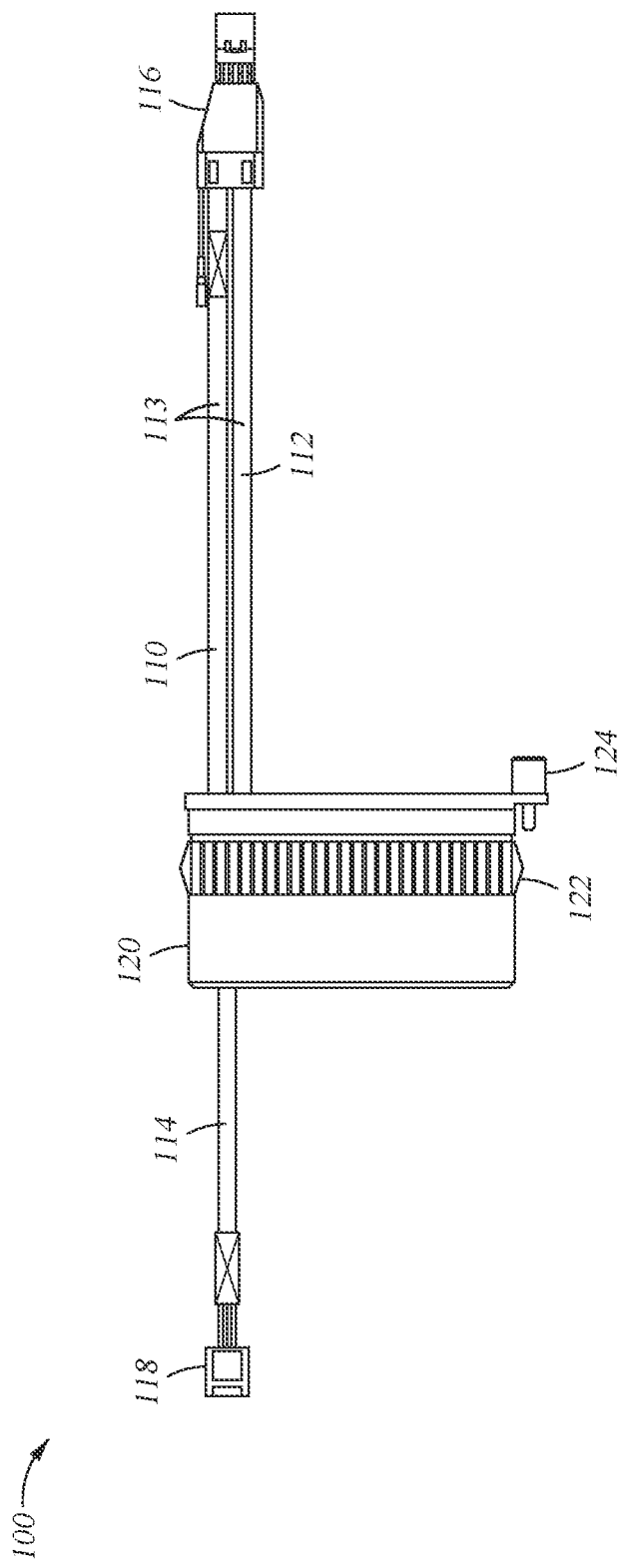
FIG. 1 illustrates a cable assembly, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In various instances, when installing or maintaining a computer system, the cables of the computer system may incur damage. The cables may include a electromagnet (EMC) jacket configured to shield conductors of the cable from external electronic interference and prevent the conductors of the cable from generating electronic interference.

However, the EMC jacket increases the thickness of the cable and reduces the flexible of the cable, increasing the possibility that cable. The thickness of the cables makes it more difficult to route the cables within the computer system, and the reduction in the flexibility of the cables increases the probability that the cable will incur damage when maintenance of the computer system is performed. Further, the use of spliced (or connected) cables having EMC jacketed portions and portions lacking an EMC jacket, may cause the cables to underperform as the signal integrity of such cables is typically decreased.

In the following description a cable assembly is described that includes cables that have a first portion with an EMC jacket and a second portion that lacks an EMC jacket without a reduction in signal integrity. Such cables have increased reliable as compared to more conventional cables as the portion of the cable that is routed within a computer system is more flexible. Further, as the cable is formed from continuous conductors, the signal integrity of the cable is not substantially reduced. Further, in the following description, an improved chassis for a server node is described. For example, the chassis for the server node includes a passageway for routing the cable assembly.

Turning to the Figures, FIG. 1 illustrates a cable assembly 100 which includes cable 110 and a connector device 120. Further, the cable assembly 100 may be used to couple elements of a computing system together. For example, the cable assembly 100 may couple one or more hard drives located within a first expansion drawer (e.g., a node) with a processing module of the computing server.

The first cable includes an external portion 112 and an internal portion 114. The external portion 112 has an electromagnetic (EMC) shielding jacket 113 and a connector 116. Further, the internal portion 114 has connector 118 but lacks a EMC shielding jacket. In one or more embodiments, the first cable 112 is a continuous cable that is formed by the external portion 112 and the internal portion 114. Stated another way, no connectors are used to couple the external portion 112 to the internal portion 114 of the first cable 112. In one embodiment, the cable 110 is a serial attached SCSI (small computer system interface) (SAS) cable. Further, the cable 110 may be between about 50 mm and 1100 mm in length. In one embodiment, the internal portion 114 is longer than the external portion 112. In other embodiments, the external portion 112 is longer than the internal portion 112.

In one or more embodiments, the internal portion 114 is more flexible than the external portion 112. For example, the internal portion 114 may include a substantially flexible jacket as compared to the EMC jacket of the external portion 112. In one embodiment, the external portion 112 has a larger bending radius than the internal portion 114. Further, external portion 112 may be larger in diameter than that of the internal portion 114.

In one embodiment, the internal portion 114 may include a single conductor while the external portion 112 includes two separate conductors, each having an EMC shielding jacket. The single conductor of the internal portion 114 may be a twinaxial (twinax) conductor.

The internal portion 114 may be disposed within the chassis, such that the chassis electrically shields the internal portion 114 of the cable 110. Further, the external portion 112 may be at least partially located externally from the chassis. In one or more embodiments, the external portion 112 resides completely outside the chassis. In other embodiments, the external portion 112 is partially disposed internally to and externally to the chassis. In one embodiment, the chassis is a chassis of a expansion drawer for a computer server device.

The connector device 120 of the cable assembly includes a EMC shield area 122 and a retainer 124. In one embodiment, the EMC shield area 122 electrically couples the connector device 120 with the housing of a chassis. For example, the chassis may the chassis of a expansion drawer of a computer server. The EMC shield area 122 may ground the connector device 120 with the chassis. In one embodiment, the EMC shielding jacket of the cable 110 is coupled to the EMC shield area 122 of the connector device 120 and electrically coupled to the housing of the chassis. In such an embodiment, the EMC shielding jacket of the external portion 112 is grounded to the housing of the chassis via the EMC shield area 122 of the connector device 120.

The EMC shield area 122 is a conductive region. Further, the EMC shield area 122 may include one more conductive extensions or conductive fingers that come in contact with the conductive chassis effectively grounding the connector device 120.

The retainer 124 is configured to attach the cable assembly 100 to the chassis of a node of a computer system and/or couple the cable assembly 100 to the chassis of a node of a computer system. For example, the chassis may the chassis of a expansion drawer of a computer server. In one embodiment, the retainer is a threaded element. For example, the retainer may be a screw or bolt. In another embodiment, the retainer 124 is configured to receive a latch of the chassis.

Figure 2:
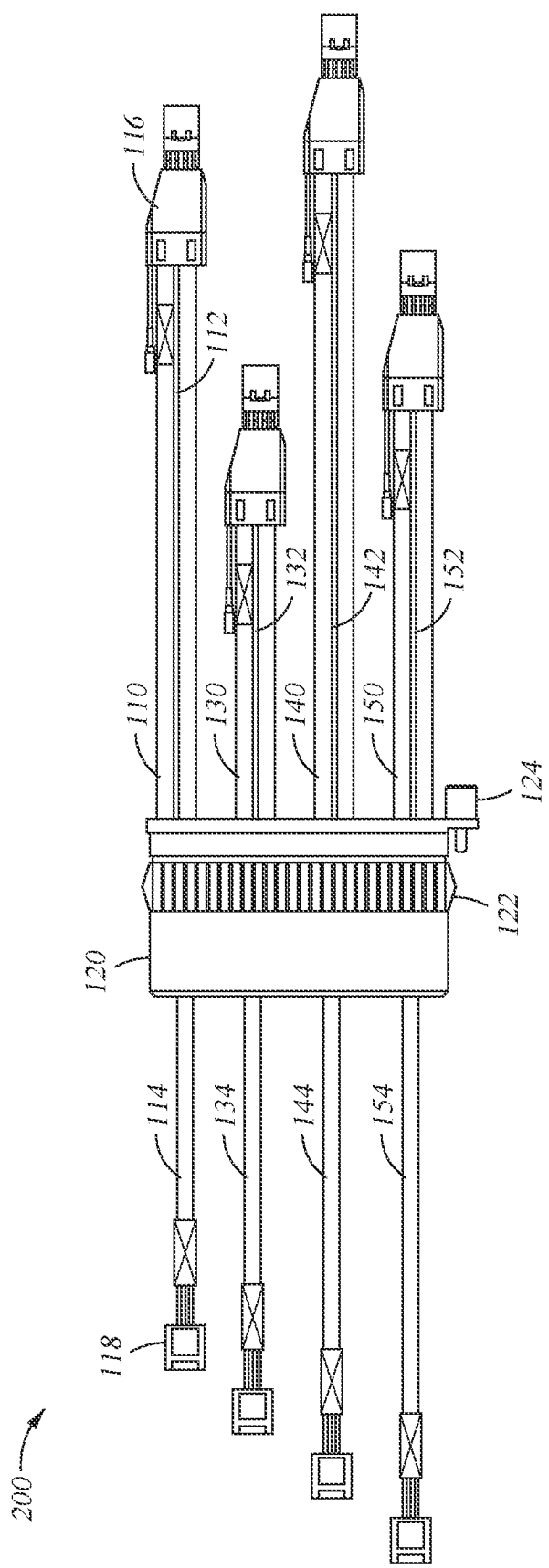
FIG. 2 illustrates a cable assembly, according to one or more embodiments.

FIG. 2 illustrates a cable assembly 200 including cables 110, 130, 140 and 150. Further, while the embodiment of FIG. 2 includes four cables, in other embodiments, the cable assembly 200 may include other numbers of cables. For example, the cable assembly 200 may include less than four cables or more than four cables. In one embodiment, the cable assembly 200 includes an even number of cables. In other embodiments, the cable assembly 200 includes an odd number of cables.

Each of the cables 110, 130, 140 and 150 includes an external portion (e.g., external portions 112, 132, 142 and 152, respectively) having an EMC shielding jacket. Further, each of the cables 110, 130, 140, and 150 includes an internal portion (e.g., 114, 134, 144 and 154, respectively) that lacks an EMC shielding jacket. In one embodiment, the internal portion (e.g., 114, 134, 144 and 154) of each cable (e.g., 110, 130, 140 and 150) is more flexible (e.g., has a smaller bending radius) than and/or smaller in diameter the external portion (112, 132, 142 and 152). Further, each of the external portions 112, 132, 142 and 152 may include a connector and each of the internal portions 114, 134, 144 and 154 may include a connector.

In one embodiment, the EMC shielding jacket of each external portion of the cables is coupled to the EMC shield area 122 of the connector device 120. As is stated above, the EMC shield area 122 is a conductive region which electrically couples the connector 120 and the external portions (112, 132, 142 and 152) of each of the cables (110, 130, 140 and 150) with the conductive chassis, thereby grounding the connector device and the external portions.

Figure 3:
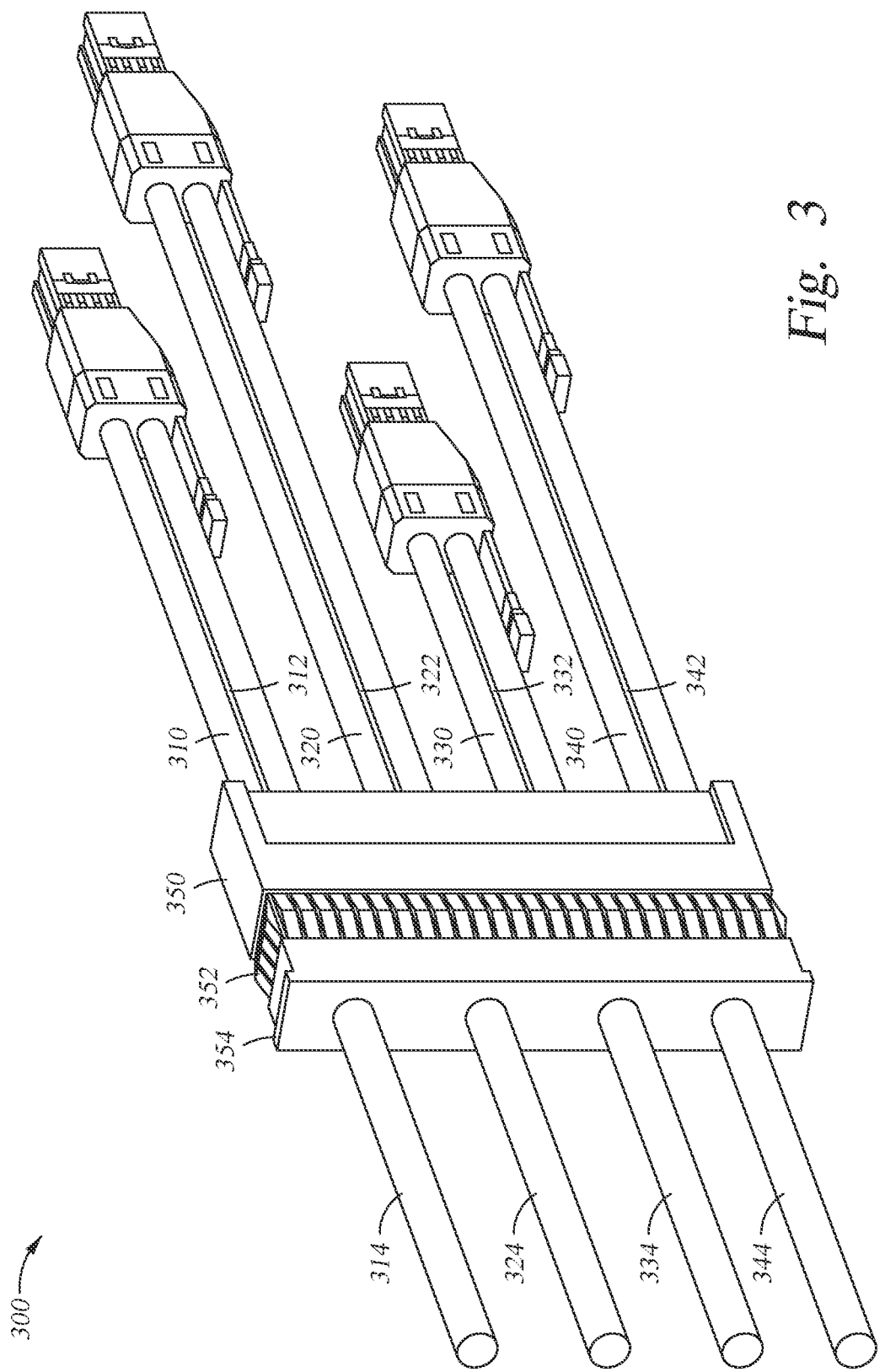
FIG. 3 illustrates a cable assembly, according to one or more embodiments.

FIG. 3 illustrates an alternative embodiment of cable assembly 300. The cable assembly 300 includes cables 310, 320, 330, and 340 and connector device 350. Each of the cables 310, 320, 330, and 340 are configured similar to that of cables 110, 130, 140, and 150 of FIG. 2. For example, each of the cables 310, 320, 330, and 340 includes an external portion (e.g., external portions 312, 322, 332 and 342, respectively) having an EMC shielded jacket and a connector. Further, each of the cables includes an internal portion (e.g., internal portions 314, 324, 334, and 344) that lacks a EMC shielded jacket. While the internal portions 314, 324, 334 and 344 are not shown as having a connector, in various embodiments, each of the internal portions may terminate at a respective connector.

Further, as compared to connector device 150, the connector device 350 includes retainer 354 that is configured to receive a latch of a chassis to retain the cable assembly within the chassis. The latch also maintains an electrical connection between the EMC shield area 352 and a chassis of a node of a computer system.

Figure 4:
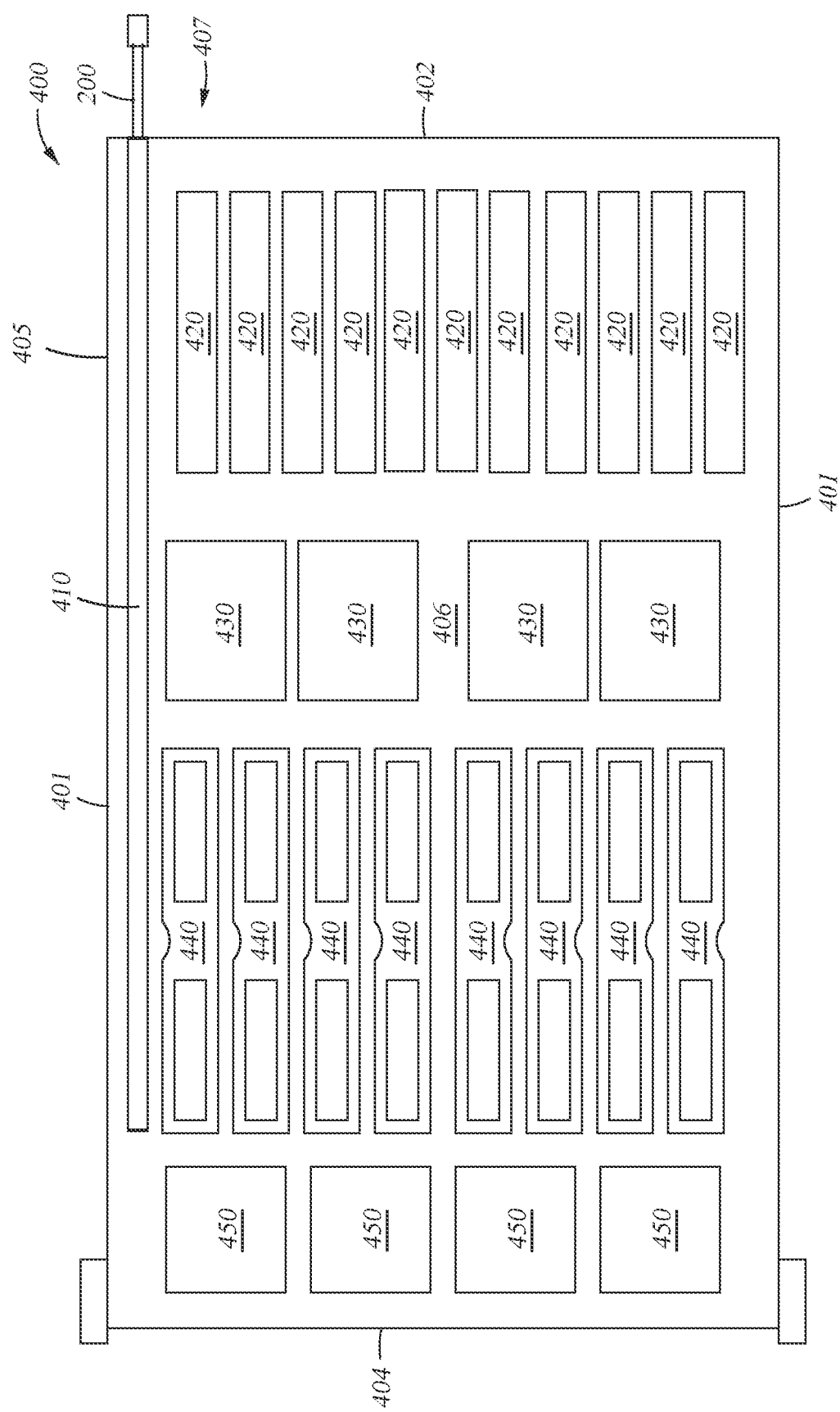
FIG. 4 illustrates a node of a computer system, according to one or more embodiments.

FIG. 4 illustrates a box diagram of node 400 for a computing server device. In one embodiment, the node 400 is an expansion drawer for a server. The node 400 includes a chassis 405, external adapters 420, processor sockets 430, memory modules 440, and hard drive bays 450. In one or more embodiments, the node 400 may also include fans and/or power supplies disposed proximate hard drive bays 450. Further, the node 400 includes passageway 410 in which cable assembly 200 is disposed. In one embodiment, the passageway 410 is located proximate side 401 of the node 400. The passageway 410 may extend from a first end 402 towards the internal region of the node 400. The length of the passageway 410 may be selected such that the cables of the cable assembly are able to couple with the desired elements of the node. For example, if the cables are to be coupled with hard drives within the hard drive bays 450, the passageway 410 extends from the end 402 to at least an area proximate the hard drive bays 450. In various embodiments, the length of the passageway 410 may be less than a length of the chassis from the first end 402 to the second end 404. Further, the passageway 410 may include one or more walls. In one embodiment, the passageway 410 includes two or more walls. The passageway 410 includes one or more retainer elements configured to couple with a connector (e.g., connector 120 or 520) and maintain an electrical connection between the connector and the chassis 405.

The external adapters 420 may be peripheral component interconnect express (PCIe) adapters. In one embodiment, there may be one to eight PCIe adapters. The processor sockets 430 may connect processors to the node 400. In one embodiment, the node 400 may include one to eight processors. The memory modules 440 each couple a random access memory (RAM) module to the node 400. The RAM may be dual in-line memory modules. In one embodiment, the memory modules 440 may include 32 slots, each configured to receive a RAM module. In other embodiments, other numbers of slots may be utilized.

The hard drive bays 450 receive one or more hard drives for data storage. Further, fans may be utilized to cool the components of the node 400 and power supplies may be utilized to power the components of the node 400.

While FIG. 4 illustrates cable assembly 200, any one of the other cable assemblies 100 or 300 described herein may be utilized by embodiment of FIG. 4. In one embodiment, the cables of the cable assembly 200 couple to the hard drives of the hard drive bays 450 and provide a connection external to the node 400 via the external portions. In one embodiment, each cable of the cable assembly is coupled to a different hard drive.

Figure 5:
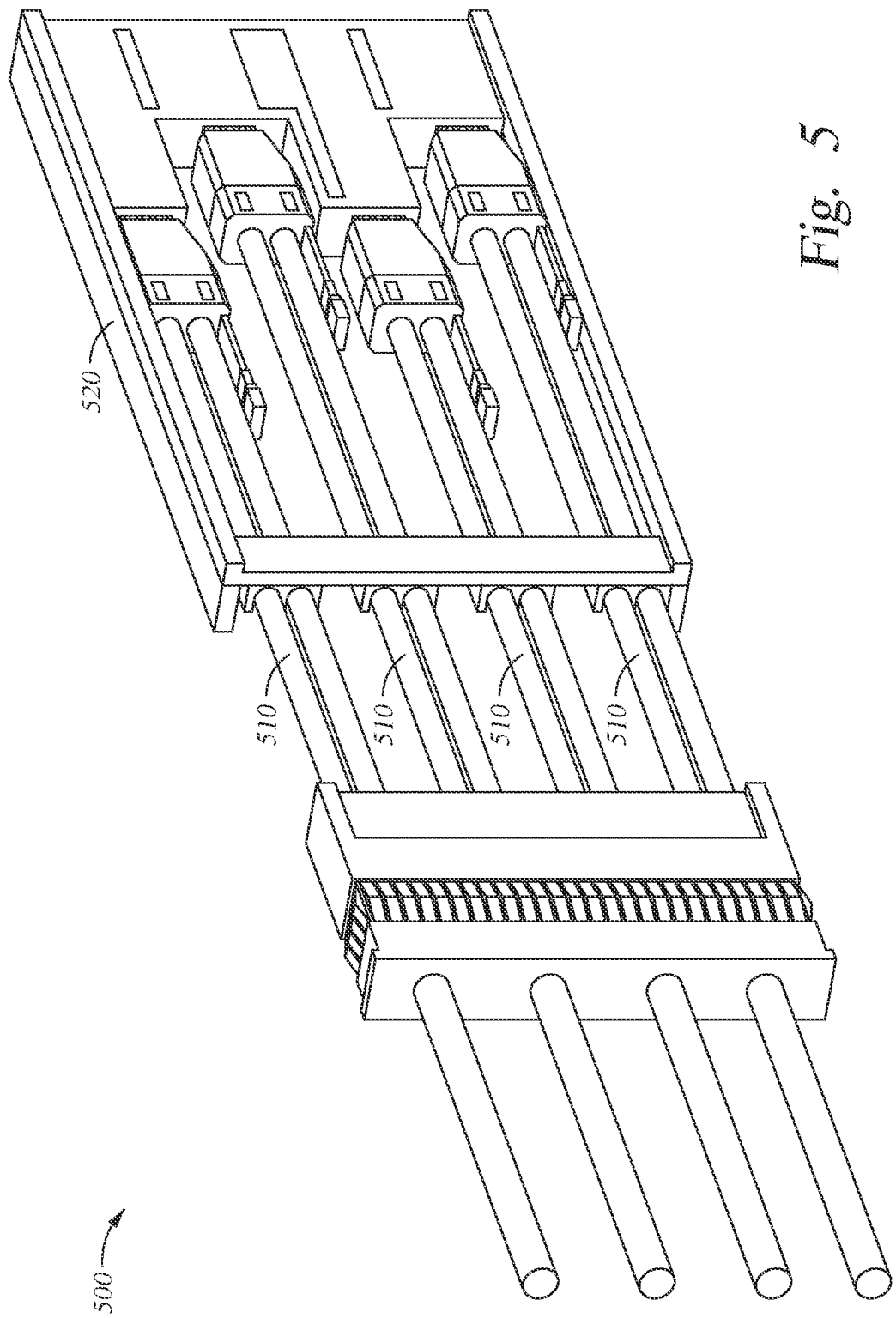
FIG. 5 illustrates a cable assembly, according to one or more embodiments.

In one embodiment, the cable assembly 200 is configured to be inserted internally to the chassis 405 of the node 400 such that the cables are pulled from the internal region 406 of the node 400 to a region external 407 to the node 400. In one embodiment, to assist in guiding the cables from being pulled from the internal region of the chassis 405 to the region external to the node 400 a cable assembly includes a retainer guide. For example, FIG. 5 illustrates cable assembly 500 having cables 510 and retainer guide 520. In one embodiment, the retainer guide 520 assists in guiding the cables 510 from an internal location of a node (e.g., the node 400) to an external position of the node. Further, the retainer guide 520 may be removable and is removed after the cables have been routed through the passageway 410. In one embodiment, the retainer guide 520 holds all of the cables 510 together and is then removed after the cable assembly 500 has been installed.

In another embodiment, the cable assembly 200 is inserted through first end 402 and the connector device of the cable assembly is secured externally to the node 400 along the first end 402 via the retainer. For example, the retainer 124 of connector 120 may be coupled to the chassis 405 of the node 400 along first end 402.

Figure 6:
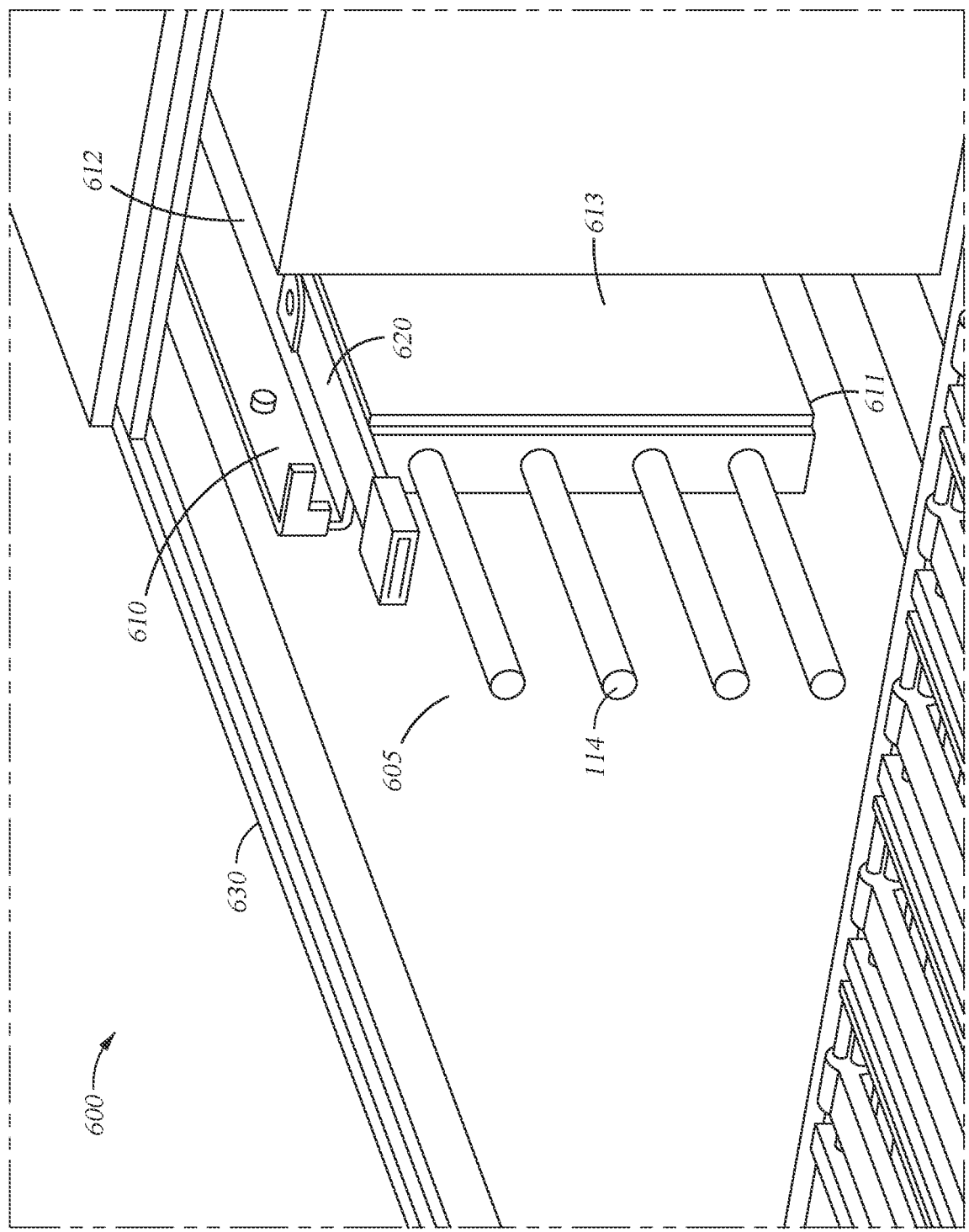
FIG. 6 illustrates a partial view of a chassis, according to one or more embodiments.

FIG. 6 is a partial cutaway top view of chassis 630 of node 600. In FIG. 6, a passageway 610 is illustrated as having latch 620. The latch 620 connects with the retainer of a connector of a cable assembly 605 to hold the cable assembly 605 within the passageway 610. In one embodiment, the latch 620 ensures that the EMC shielding of the cable assembly remains in electrical contact with the chassis 630, such that the connector and any cables electrically coupled to the connector are grounded. Further, as is illustrated, the passageway 610 is defined by one or more walls 611, 612, and 613. Walls 611 and 612 are coupled to the to the chassis 630, and the chassis forms a fourth wall of the passageway 610. In another embodiment, latch 620 may be omitted, and the connector may couple via a retainer to a back side of the chassis. Although not shown, the internal portions 114 of the cable assembly are connected to internal components in the chassis 630 (e.g., hard drives, a motherboard, expansion slot, etc.).

Figure 7:
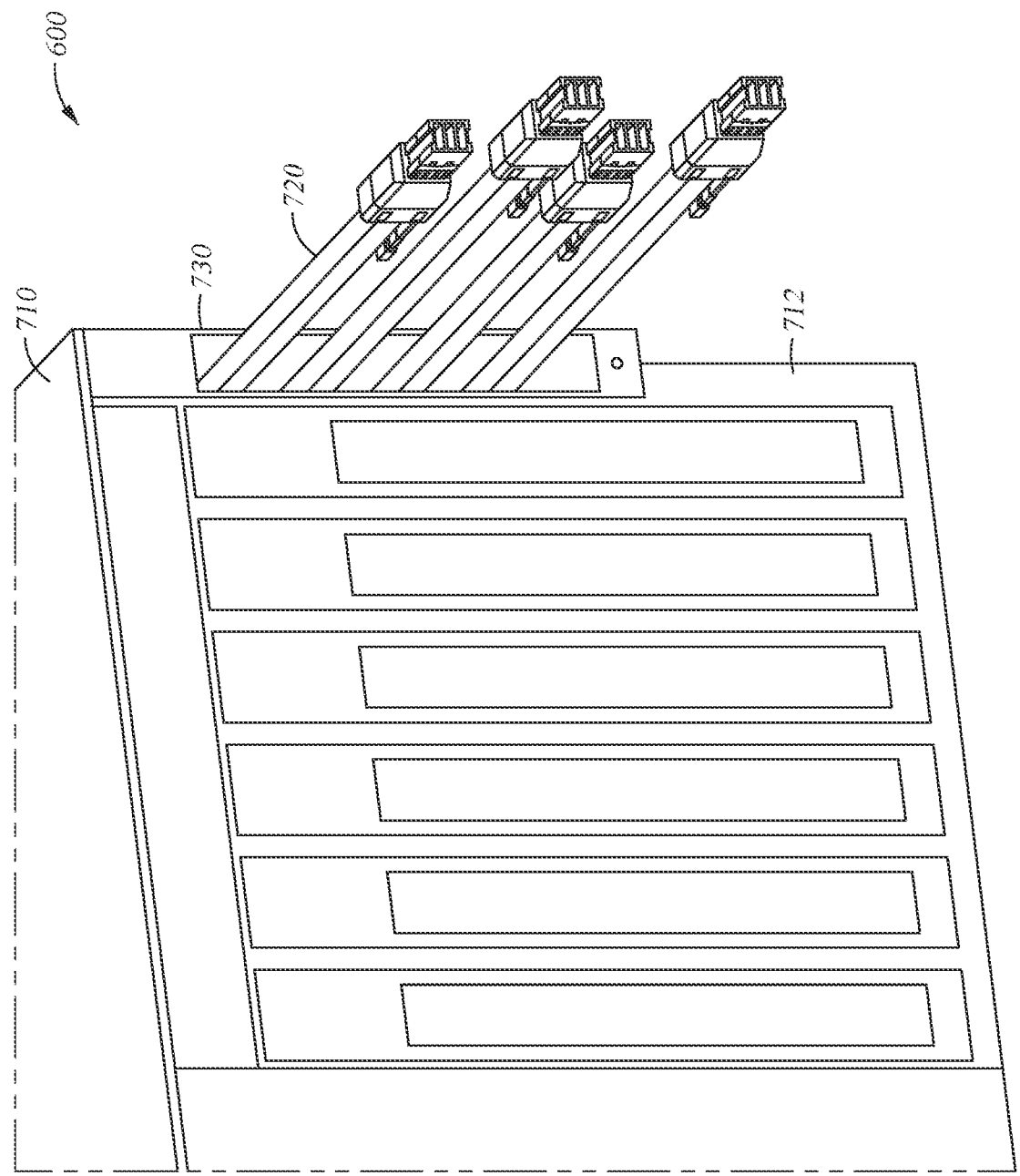
FIG. 7 illustrates a backside view of a node, according to one or more embodiments.

FIG. 7 illustrates a back view of the node illustrated in FIG. 6. Specifically, FIG. 7 illustrates a back side 712 of the node 600. Further, as is illustrated, the cable assembly 605 enters the chassis 710 of the node 600 via passageway 610. In one embodiment, the passageway 730 extends from the back side 712 internally into the node 700. In the embodiment of FIG. 7, the cables of the cable assembly extend from an internal region of the node 700 to an external region of the node. Further, in the illustrated embodiment, the connector (e.g., connector 350) maybe positioned within the internal region of node 700.

Figure 8:
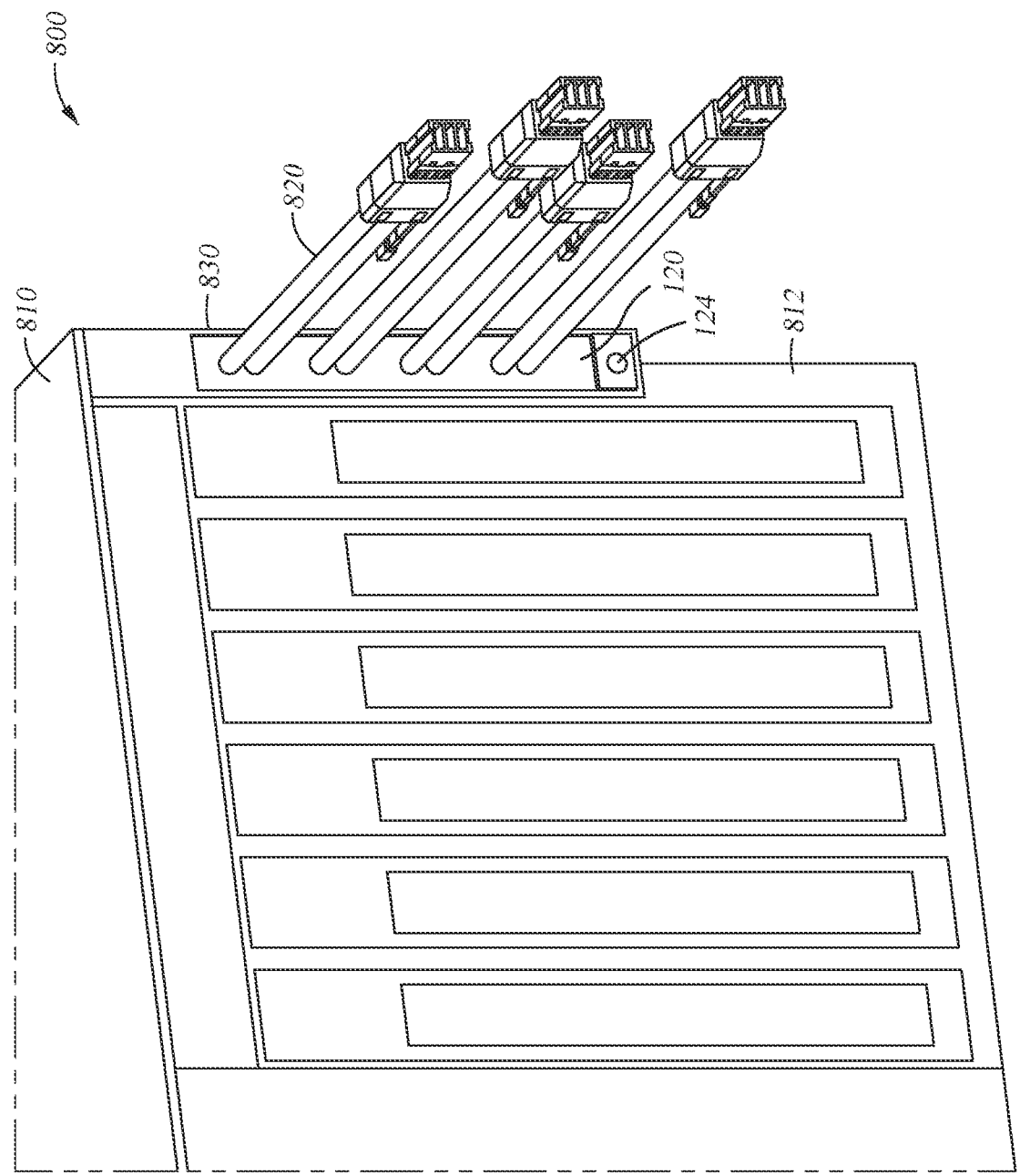
FIG. 8 illustrates a backside view of a node, according to one or more embodiments.

FIG. 8 illustrates a partial view of node 800. Contrary to the embodiment of FIGS. 6 and 7, in the embodiment of FIG. 8, a cable assembly (e.g., cable assembly 100) is attached to the back side 812 of the chassis 810 via a screw (or other threaded element) instead of a latch which is used in the embodiments of FIGS. 6 and 7. Cable assembly 100 is installed in the chassis 810 of the node 800 via passageway 830. Further, the cables of the cable assembly 820 extend from an internal region of the node 800 to an external region of the node. The cable assembly 820 includes connector 120 which includes retainer element 124. The retainer element 852 may be a threaded element that is configured to screw into a threaded element of chassis 800.

In one embodiment, node 600 or node 800 may be coupled to a processing module of a computer server. For example, the nodes may be coupled via cable assemblies 720 and 820, respectively. Further, the computer server may include one or more nodes similar to that of node 700 and node 800. The combined nodes and processing module are utilized together and form the computer server. In one or more embodiments, node 700 or node 800 may be installed within a shared mounting rack as the processing module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A chassis for a computing system, the chassis comprising:
   a plurality of processor sockets;
   a plurality of memory modules, wherein each of the plurality of memory modules is configured to house one or more memory cards;
   a plurality of hard drive bays, wherein each of the plurality of hard drive bays is configured to house one or more hard drives and is positioned at a first end of the chassis;
   a cable pass-through configured to receive a cable assembly, the cable pass- through extends from the first end of the chassis toward a second end of the chassis along a first side of the chassis, wherein a first cable of the cable assembly comprises an external portion comprising a first conductor and an electromagnetic (EMC) shielding jacket) disposed on the first conductor, and an internal portion being a twinaxial conductor comprising the first conductor and a second conductor and lacking an EMC shielding jacket; and
   a retainer element configured to retain the cable assembly to the chassis.

2. The chassis of claim 1, wherein the external portion further comprises a first connector disposed on an end of the first conductor, and wherein the internal portion comprises a second connector, the second connector disposed on an end of the twinaxial conductor.

3. The chassis of claim 2, wherein the cable assembly further comprises:
   a connector device comprising:
      a shield area configured to electrically couple with the chassis; and
      a retainer configured to physically couple the cable assembly with the chassis, wherein the connector device is configured to:
         electrically couple the external portion of the first cable with the chassis, and wherein the external portion of the first cable meets the internal portion of the first cable at the connector device.

4. The chassis of claim 3, wherein the retainer element is positioned on an external side of the second end of the chassis and is threaded, and the retainer is threaded and is configured to screw into the retainer element.

5. The chassis of claim 3, wherein the cable assembly comprises:
   a second cable comprising;
      an external portion having an EMC shielding jacket and a third connector; and
      an internal portion lacking an EMC shielding jacket and a fourth connector, wherein the external portion of the second cable meets the internal portion of the second cable at the connector device, and wherein the connector device is further configured to:
         electrically couple the external portion of the second cable with the chassis.

6. The chassis of claim 3, wherein the EMC shielding jacket is electrically coupled to the shield area of the connector device.

7. The chassis of claim 2, wherein the second connector of the internal portion of the first cable is configured to couple to a hard drive of the one or more hard drives housed with the plurality of hard drive bays.

8. The chassis of claim 2, wherein the first cable is a serial attached SCSI (SAS) cable.

9. A computing system comprising:
   a first node comprising a chassis, the chassis comprising:
      a plurality of processor sockets;
      a plurality of memory modules, wherein each of the plurality of memory modules is configured to house one or more memory cards;
      a plurality of hard drive bays, wherein each of the plurality of hard drive bays is configured to house one or more hard drives and is positioned at a first end of the chassis;
      a cable pass-through configured to receive a cable assembly, the cable pass-through extending from the first end of the chassis toward a second end of the chassis along a first side of the chassis, wherein a first cable of the cable assembly comprises an external portion comprising a first conductor and an electromagnetic (EMC) shielding jacket disposed on the first conductor, and an internal portion being a twinaxial conductor comprising the first conductor and a second conductor and lacking an EMC shielding jacket; and
      a retainer element configured to retain the cable assembly to the chassis.

10. The computing system of claim 9, wherein the external portion comprises a first connector disposed on an end of the first conductor, and wherein the internal portion comprises a second connector, the second connector disposed on an end of the twinaxial conductor.

11. The computer system of claim 10, wherein the cable assembly further comprises:

a connector device comprising:
  a shield area configured to electrically couple with the chassis; and
  a retainer configured to physically couple the cable assembly with the chassis, wherein the connector device is configured to:
    electrically couple the external portion of the first cable with the chassis, and wherein the external portion of the first cable meets the internal portion of the first cable at the connector device.

12. The computing system of claim 11, wherein the retainer element is positioned on an external side of the second end of the chassis and is threaded, and the retainer of the cable assembly is threaded and is configured to screw into the retainer element.

13. The computing system of claim 11, wherein the cable assembly comprises:
  a second cable comprising;
    an external portion having an EMC shielding jacket and a third connector; and
    an internal portion lacking an EMC shielding jacket and a fourth connector, wherein the external portion of the second cable meets the internal portion of the second cable at the connector device, and wherein the connector device is further configured to:
      electrically couple the external portion of the second cable with the chassis.

14. The computing system of claim 11, wherein the second connector of the internal portion of the first cable is configured to couple to a hard drive of the one or more hard drives housed with the plurality of hard drive bays.

15. The computing system of claim 10, wherein the first cable is a serial attached SCSI (SAS) cable.

16. The computing system of claim 9, wherein the retainer element is positioned within the chassis proximate the cable pass-through within an interior portion of the chassis.

* * * * *